Jan. 24, 1956　　J. J. WALLACE　　2,731,674
COTTON GIN WITH LOW VELOCITY AIR BLAST
FOR DEMOTING LINT ON GINNING CYLINDER
ANTERIOR TO DOFFING POINT
Filed Nov. 28, 1952

INVENTOR
Jeffrey J. Wallace

BY Mason, Fenwick & Lawrence
ATTORNEYS

# United States Patent Office 2,731,674
Patented Jan. 24, 1956

2,731,674

COTTON GIN WITH LOW VELOCITY AIR BLAST FOR DEMOTING LINT ON GINNING CYLINDER ANTERIOR TO DOFFING POINT

Jeffrey J. Wallace, Amite, La., assignor to Gullett Gin Company, Amite, La., a corporation of Louisiana Application November 28, 1952, Serial No. 322,902

4 Claims. (Cl. 19—58)

This invention relates to an improvement in cotton gins both of the air blast and brush, lint doffing type having for its general object to subject the lint fringe on the saw cylinder, through a wide arc between the point of its emergence from between the ginning ribs and the doffing point, to the scouring action of a voluminous air blast moving at a velocity less than the linear speed of the saw cylinder, which changes its direction in the region of its impingement upon the periphery of the saw cylinder, blowing inwardly across the lint adjacent the ginning ribs, circumferentially in the direction of rotation of the saws in the intermediate region of said arc, and outwardly across the lint in that part of said arc adjacent the doffing point, whereby the fringe lint is subjected to a compound sweeping action by said blast, resulting in the removal from the lint of the motes, dust and other foreign matter which is not firmly pressed against the forward edges of the saw teeth.

Another object of the invention is to provide a suction device constituting a wall of a mote chamber bounded by the upper part of the ginning ribs and a substantial arcuate part of the saw cylinder above the doffing zone, said suction device comprising an air inlet duct open to atmosphere having a nozzle extending the length of the saw cylinder opening into said mote chamber and of capacious width to admit a large volume of air at low velocity directed to blow the air through the lint toward the saw cylinder adjacent said ginning ribs, and comprising also a mote discharge flue opening into said mote chamber below said nozzle subjected to evacuating means for withdrawing the air through the lint fringe in a direction away from the saw cylinder adjacent the lower part of the mote chamber, the vacuum maintained in said lint discharge flue being the means for drawing the air blast in through said air inlet duct and nozzle.

Other objects of the invention will appear as the following description of a practical embodiment thereof proceeds.

In the drawing throughout the figures of which the same reference characters have been used to denote identical parts:

Figure 1:
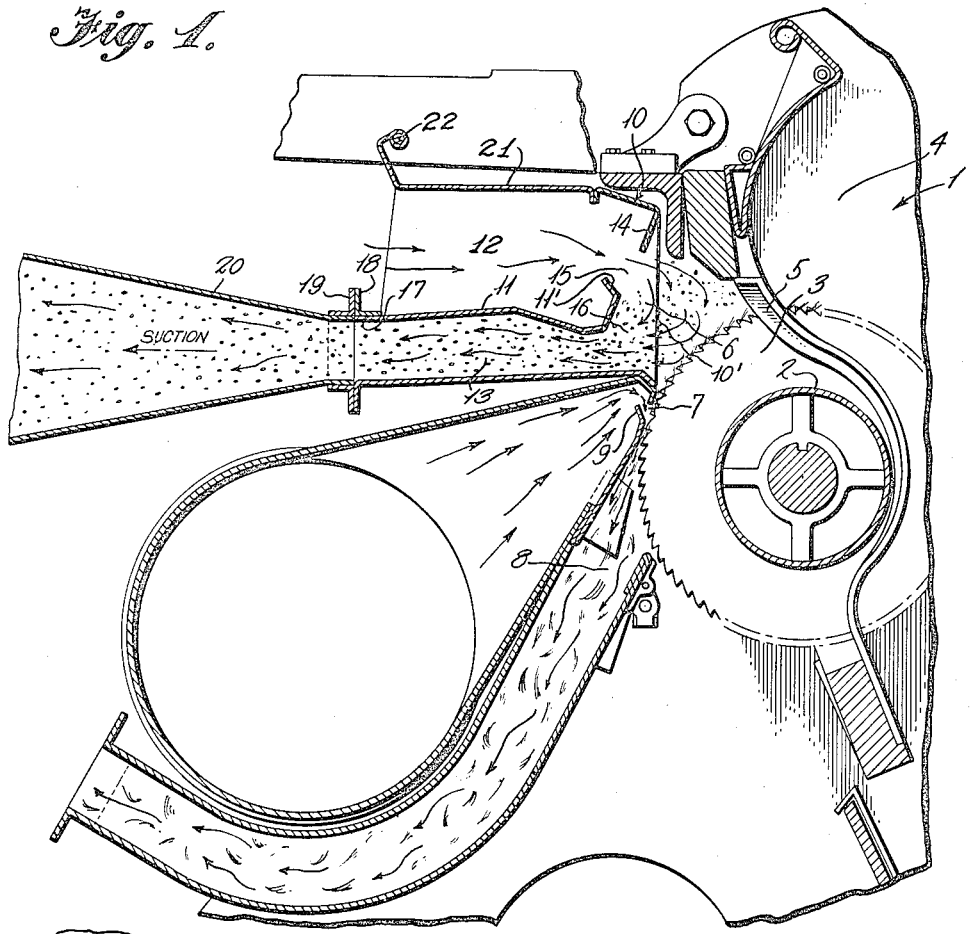
Figure 1 is a vertical longitudinal sectional view through a cotton gin embodying the principles of the present invention, partly broken away to omit parts not essential to the description.
Figure 2:
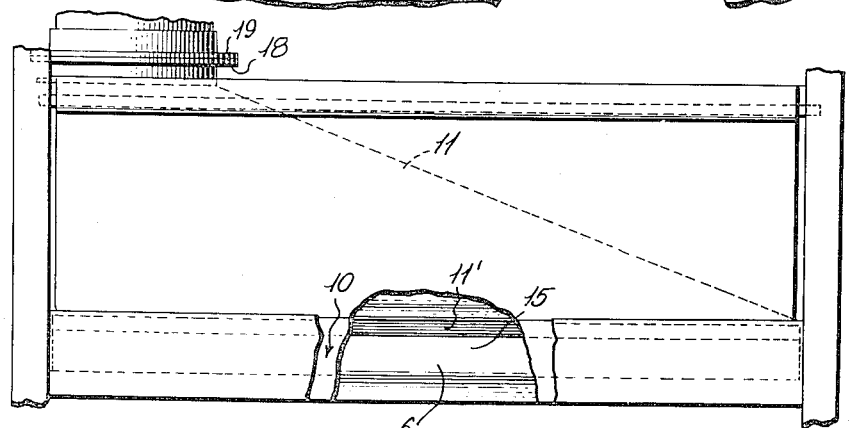
Figure 2 is a plan view of the lint cleaning unit.

Referring now in detail to the figures, the numeral 1 represents the gin as a whole, having the conventional saw cylinder 2 provided with the spaced blades 3 that rotate together successively through the lower part of the roll box 4, between the ginning ribs 5, through the lower part of the moting chamber 6, then past the doffing zone 7 where the lint is removed from the saw teeth and delivered to an underlying lint duct 8, by an air blast from a doffing nozzle 9, as shown, or by a brush type doffer, not shown but which is common in the art.

The lint emerges from between the ginning ribs 5 in the form of locks looping about the abrupt shoulders of the saw teeth, with their free ends or fringe standing out under the urge of centrifugal force beyond the periphery of the saw cylinder. As the lint attached to the teeth passes between the ginning ribs, larger motes are thrown off centrifugally into the mote chamber, also a certain amount of smaller motes are free which float in the atmosphere of the mote chamber. It is conventional to provide the mote chamber with a mote discharge duct and an air blast nozzle discharging into this duct in a direction away from the mote chamber for entraining the mote laden atmosphere of the mote chamber and carrying off the motes, but this feature is eliminated from the gin incorporating the present invention. My Patents 2,253,456 granted August 19, 1941, and 2,322,553 granted June 22, 1943, disclosed gins as above described.

In gins of this type, only a portion of the mote material is removed in the manner indicated, a large portion remaining with the lint as it traverses the lower part of the mote chamber on the saw cylinder, such mote material being doffed with the lint and carried into the lint duct, increasing the burden of subsequent cleaning.

The improvement which characterizes the present invention comprises blast means for cleaning the lint fringe while traveling on the saw cylinder through the mote chamber.

Said means comprises a tubular casing, as a whole designated by the reference numeral 10, the specific shape and construction of which may vary somewhat to suit the particular gin with which it is associated. In the present illustrative embodiment it is shown as having an open rectangular front end, one of the forward side edges being shown at 10'. Said open end extends the full length of the saw cylinder. The casing 10 is divided transversely by a partition 11 into an upper air inlet duct 12 and a lower mote discharge flue 13. The inlet duct has a flange 14 at the top bent downwardly and rearwardly from the upper edge of the front end and terminating at an intermediate point in the height of the air inlet duct. The partition 11 is bent up at its front end toward the flange 14, and has its terminal margin 11' bent obliquely toward the rear, the edge of the flange 14 and the terminal margin 11' being widely spaced apart to form a widely open nozzle 15 which extends the full width of the saw cylinder and is directed toward the arc of the saw cylinder exposed in the mote chamber. The air inlet duct 12 is preferably of uniform cross-section throughout, having a width equal to the length of the nozzle 15, and it is open to atmosphere at its rear end.

The mote discharge flue 13 has a flaring mouth 16 at its forward end extending from the lower side of the nozzle 15 to a point adjacent the lower end of the exposed arc of the saw cylinder, the lower edge of said mouth being narrowly spaced from the saw cylinder. The mouth 16 extends the full length of the saw cylinder. To the rear of said mouth the mote discharge flue is preferably formed as a convergent transition terminating in a rear end portion of circular cross-section having a coupling flange 18 for connection to a similar flange 19 on the adjacent end of a suction duct 20 connected to a suction fan, not shown.

On account of the unusual width of the nozzle 15, it is in the trajectory path of such of the larger motes as are thrown centrifugally from the saw cylinder at their point of emergence from between the ginning ribs, and which motes may fly through said nozzle into the air inlet duct, requiring that the latter be cleaned from time to time. To facilitate cleaning, the air inlet duct is provided with a displaceable cover 21 which may be swung about its hinge axis 22 to open the top of the duct, giving access thereinto.

The flange 14 and the up bent end of the partition 11 are inset from the forward end of the casing 10, defining a chamber at their forward side which is open to the mote chamber and may be considered a part thereof.

The suction in the suction duct 20 is the motivating force which draws air into the inlet duct 12 and creates the air blast through the nozzle 15. The proximity of the mouth 16 of the mote discharge flue to the nozzle 15, the width of said nozzle, the capacity of the inlet duct 12, the direction of the nozzle 15 and the degree of vacuum maintained in the duct 20, produce a curvilinear blast of air of large volume and of less velocity than the peripheral speed of the saw cylinder, which blows through the lint toward the saw cylinder adjacent the ginning ribs, through the lint away from the saw cylinder adjacent the lower edge of the mouth of the lint discharge flue, and through the lint in the direction of travel of the saw cylinder in the intermediate part of the exposed arc of the saw cylinder. Thus, the lint is swept by said air blast in three different directions and scoured clean of practically all motes and other adherent foreign material except such as may be tightly held against the teeth of the saws by the pressure of the bights of the cotton locks against said teeth. The blast, where it blows in the direction of travel of the saw cylinder reduces the pressure of the lint against the teeth and thus loosens the lint at these points and frees some mote material that otherwise would be tightly held. The relatively low velocity of the blast assures that the lint will not be detached from the teeth. The air blast also purges the mote chamber of such mote material as may fly free from the lint as it emerges from between the ginning ribs.

The structural cleaning unit as above described may, with immaterial modifications be adapted to almost any type of gin in present use, whether it be of the air blast or brush doffing type, and regardless of whether a saw or licker cylinder be employed, the positional requirement being that the unit shall form with the adjacent gin structure a substantially closed moting chamber to which a substantial arcuate extent of the surface of the cylinder, lying between the ginning ribs and the lower edge of the mouth of the mote discharging flue is exposed, whereby a controlled vacuum in the mote discharge flue creates a curvilinear air blast of large volume and lower velocity than the peripheral speed of the cylinder, active upon the lint substantially throughout the exposed arcuate extent of the cylinder.

While I have in the above description disclosed a practical embodiment of the invention, it will be understood by those skilled in the art that the specific details of construction and arrangement of parts is by way of illustration and not to be construed as limiting the scope of the invention.

What I claim is:

1. Cotton gin comprising in combination, a saw cylinder, ginning ribs and doffing means, conventionally correlated, said gin providing a moting chamber in which said saw cylinder is exposed throughout an area extending from said ginning ribs substantially to said doffing means, wall structure bounding said moting chamber on the side opposite said saw cylinder, said wall structure forming the front wall of an air inlet duct, an air inlet nozzle through said wall structure at an intermediate point in the height thereof constructed and positioned to direct an air blast across said moting chamber toward the upper part of said exposed area adjacent said ribs, a mote discharge duct below said wall structure having a mouth confronting the lower part of said exposed area, said mote discharge duct communicating with air evacuating means for inducing a looping blast in said moting chamber, the position of said nozzle and mouth, and the force and volume of the air blast being so correlated that reversal in the direction of said blast takes place in the path of travel of the lint fringe outstanding from the saw cylinder, whereby said blast blows transversely through said lint fringe in opposite directions respectively in the upper and lower parts of said exposed area, and, intermediately, in the direction of travel of said lint fringe, at less velocity than the peripheral speed of said saw cylinder.

2. Cotton gin as claimed in claim 1, said air inlet duct and said mote discharge duct comprising a structural unit including a common partition forming a dividing wall between said ducts, the width of said ducts extending the full length of the saw cylinder adjacent said moting chamber, said air inlet duct being of substantially uniform width throughout its length and open to atmosphere at the rear substantially throughout the cross-sectional area of its rear end.

3. Cotton gin as claimed in claim 1, said air inlet duct and said mote discharge duct comprising a structural unit including a common partition forming a dividing wall between said ducts, the width of said ducts extending the full length of the saw cylinder adjacent said moting chamber, said air inlet duct being of substantially uniform width throughout its length and open to atmosphere at the rear substantially throughout the cross-sectional area of its rear end, the upper wall of the said air inlet duct having an opening therethrough with hinged closure, positioned to give access to the lower wall behind said nozzle, for cleaning.

4. Cotton gin comprising in combination, a saw cylinder, ginning ribs and doffing means, conventionally correlated, said gin providing structure defining a moting chamber in which said saw cylinder is exposed throughout an area extending from said ginning ribs substantially to said doffing means, an air duct terminating in an air inlet nozzle opening into said mote chamber on the side opposite said saw cylinder at an intermediate point in the height of said moting chamber, constructed and positioned to direct an air blast across said moting chamber toward the upper part of said exposed area adjacent said ribs, a mote discharge duct at a distance below said nozzle having a mouth confronting the lower part of said exposed area, said mote discharge duct communicating with air evacuating means for inducing a looping blast in said moting chamber, the position of said nozzle and mouth, and the force and volume of the air blast being so correlated that reversal in the direction of said blast takes place in the path of travel of the lint fringe outstanding from the saw cylinder, whereby said blast blows transversely through said lint fringe in opposite directions respectively in the upper and lower parts of said exposed area, and intermediately, in the direction of travel of said lint fringe, at less velocity than the peripheral speed of said saw cylinder.

References Cited in the file of this patent

UNITED STATES PATENTS

| 897,883 | Dickson | Sept. 8, 1908 |
| 1,450,592 | Guynes | Apr. 3, 1923 |
| 2,204,803 | Griffin | June 18, 1940 |